US012619726B2

(12) United States Patent
Wei et al.

(10) Patent No.: US 12,619,726 B2
(45) Date of Patent: May 5, 2026

(54) CYBER RESILIENCE INTEGRATED SECURITY INSPECTION SYSTEM (CRISIS) AGAINST FALSE DATA INJECTION ATTACKS

(71) Applicant: Intelligent Fusion Technology, Inc., Germantown, MD (US)

(72) Inventors: Sixiao Wei, Germantown, MD (US); Genshe Chen, Germantown, VA (US); Kuochu Chang, Fairfax, VA (US); Thomas M. Clemons, III, Annandale, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 458 days.

(21) Appl. No.: 17/707,277

(22) Filed: Mar. 29, 2022

(65) Prior Publication Data

US 2023/0315851 A1 Oct. 5, 2023

(51) Int. Cl.
*G06N 7/01* (2023.01)
*G06F 21/56* (2013.01)

(52) U.S. Cl.
CPC ............. *G06F 21/566* (2013.01); *G06N 7/01* (2023.01); *G06F 2221/034* (2013.01)

(58) Field of Classification Search
CPC .... G06F 21/566; G06F 2221/034; G06N 7/01
See application file for complete search history.

(56) References Cited

U.S. PATENT DOCUMENTS 8,438,129 B1 * 5/2013 Przytula .................. G06N 7/01
706/52
11,416,369 B1 * 8/2022 Trapani ................. H04L 41/145
(Continued)

FOREIGN PATENT DOCUMENTS

AU 2011265563 A1 * 7/2012 .......... F24F 11/0009
CN 112101400 A * 12/2020
(Continued)

OTHER PUBLICATIONS

Mode, Gautam Raj, Prasad Calyam, and Khaza Anuarul Hoque. "False data injection attacks in internet of things and deep learning enabled predictive analytics." arXiv preprint arXiv: 1910.01716 (2019). (Year: 2019).*

(Continued)

*Primary Examiner* — Shewaye Gelagay
*Assistant Examiner* — Samikshya Poudel
(74) *Attorney, Agent, or Firm* — ANOVA LAW GROUP, PLLC

(57) ABSTRACT

A method for detecting false data injection attacks (FDIAs) on a condition-based predictive maintenance (CBPM) system includes: collecting sensor data from sensors monitoring components of a system maintained by the CBPM system to extract features for a cyberattack detection model and gathering historical data of the system to build a cyberattack knowledge base about the system; combining the sensor data and the historical data to train the cyberattack detection model; using a graphical Bayesian network model to capture domain knowledge and condition-symptom relationships between the sensor-monitored components and the sensors; and based on the cyberattack detection model and the Bayesian network model, detecting the FDIAs on the CBPM system.

20 Claims, 15 Drawing Sheets

(56) References Cited

U.S. PATENT DOCUMENTS

| 2018/0136995 | A1* | 5/2018 | Sheppard | G06N 7/01 |
|---|---|---|---|---|
| 2018/0159879 | A1* | 6/2018 | Mestha | H04L 63/1425 |
| 2019/0041839 | A1* | 2/2019 | Zhang | G05B 23/0262 |
| 2020/0089885 | A1* | 3/2020 | Kling | G06F 21/566 |
| 2020/0134414 | A1* | 4/2020 | Chan | G06N 3/042 |
| 2022/0253677 | A1* | 8/2022 | Dan | G06N 3/006 |
| 2023/0022070 | A1* | 1/2023 | Zaloum | G06F 3/017 |
| 2023/0058974 | A1* | 2/2023 | Yan | G06N 3/047 |
| 2023/0164565 | A1* | 5/2023 | Salzman | G08G 3/00 726/23 |
| 2023/0296719 | A1* | 9/2023 | Beadle | G01S 5/0246 342/451 |
| 2023/0306106 | A1* | 9/2023 | Burceanu | G06F 21/564 |
| 2024/0045410 | A1* | 2/2024 | Mani Iyer Ramani | G05B 23/0248 |

FOREIGN PATENT DOCUMENTS

| CN | 111258297 | B | * | 6/2021 | G05B 23/0283 |
|---|---|---|---|---|---|
| CN | 114760098 | A | * | 7/2022 | |
| CN | 117375983 | A | * | 1/2024 | |
| WO | WO-2020234885 | A1 | * | 11/2020 | G01S 19/215 |

OTHER PUBLICATIONS

False Data Injection Attacks in Internet of Things and Deep Learning enabled Predictive Analytics, Dec. 2019, pp. 1-11 (Year: 2019).*

False Data Injection Attacks in Internet if Things and Deep learning enabled Predictive Analytics (Year: 2019).*

Gautam Raj Mode et al., "False Data Injection Attacks in Internet of Things and Deep Learning enabled Predictive Analytics", Dec. 13, 2019.

* cited by examiner

CYBER RESILIENCE INTEGRATED SECURITY INSPECTION SYSTEM (CRISIS) AGAINST FALSE DATA INJECTION ATTACKS

GOVERNMENT RIGHTS

The present disclosure was made with Government support under Contract No. N68335-20-C-0792, awarded by Naval Sea Systems Command (NAVSEA). The U.S. Government has certain rights in the present disclosure.

FIELD OF THE DISCLOSURE

The present disclosure generally relates to the field of data security and, more particularly, relates to a method and a system for cyber resilience integrated security inspection against false data injection attacks.

BACKGROUND

Modern US Navy ships and submarines are configured with an ever-increasing level of automation, including state-of-the-art embedded wireless sensors that monitor vital system functions. One potential use of this network of sensors is Condition-based Predictive Maintenance (CBPM), the prediction of faults in a component or system powered by advanced machine learning (ML) algorithms to reduce vessel downtime and increase readiness. However, this network of sensor nodes is vulnerable to cybersecurity attacks and susceptible to corruption through accidental or malicious events. To address these shortfalls and minimize vulnerabilities of CBPM systems, the present disclosure provides a defense system that includes both data-driven and model-based techniques to build an extensible cybersecurity layer for CBPM applications to provide enhanced cyber resiliency. The defense system is also called a cyber resilience integrated security inspection system (CRISIS) against false data injection attacks.

Specifically, a deep learning algorithm based on long short-term memory (LSTM) and gated recurrent unit (GRU) is used to detect abnormal features of generalized false data injection attacks (FDIAs) on wireless sensors of a turbofan engine simulated by NASA's C-MAPSS simulator. The dynamic nature of the turbofan engine is represented by a graphical physics-informed Bayesian Network model and is used to predict health conditions accordingly. The model characterizes the condition-symptom relationships of different engine components and sensors. The present disclosure also provides a hybrid software-in-the-loop and hardware-in-the-loop system to evaluate the effectiveness of defense mechanisms of the CRISIS system.

BRIEF SUMMARY OF THE DISCLOSURE

One aspect or embodiment of the present disclosure includes a method for detecting false data injection attacks (FDIAs) on a condition-based predictive maintenance (CBPM) system. The method includes: collecting sensor data from sensors monitoring components of a system maintained by the CBPM system to extract features for a cyberattack detection model and gathering historical data of the system to build a cyberattack knowledge base about the system; combining the sensor data and the historical data to train the cyberattack detection model; using a graphical Bayesian network model to capture domain knowledge and condition-symptom relationships between the sensor-monitored components and the sensors; and based on the cyberattack detection model and the Bayesian network model, detecting the FDIAs on the CBPM system.

Another aspect or embodiment of the present disclosure includes a cyberattack detection system. The cyberattack detection system includes sensors monitoring components of a system maintained by a condition-based predictive maintenance (CBPM) system; a memory storing computer programs; and a processor configured to execute the computer programs to: collect sensor data from the sensors to extract features for a cyberattack detection model and gather historical data of the system to build a cyberattack knowledge base about the system; combine the sensor data and the historical data to train the cyberattack detection model; use a graphical Bayesian network model to capture domain knowledge and condition-symptom relationships between the sensor-monitored components and the sensors; and based on the cyberattack detection model and the Bayesian network model, detect false data injection attacks (FDIAs) on the CBPM system.

Another aspect or embodiment of the present disclosure includes a computer-readable storage medium storing a computer program for detecting false data injection attacks (FDIAs) on a condition-based predictive maintenance (CBPM) system. The computer program performs: collecting sensor data from sensors monitoring components of a system maintained by the CBPM system to extract features for a cyberattack detection model and gathering historical data of the system to build a cyberattack knowledge base about the system; combining the sensor data and the historical data to train the cyberattack detection model; using a graphical Bayesian network model to capture domain knowledge and condition-symptom relationships between the sensor-monitored components and the sensors; and based on the cyberattack detection model and the Bayesian network model, detecting the FDIAs on the CBPM system.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
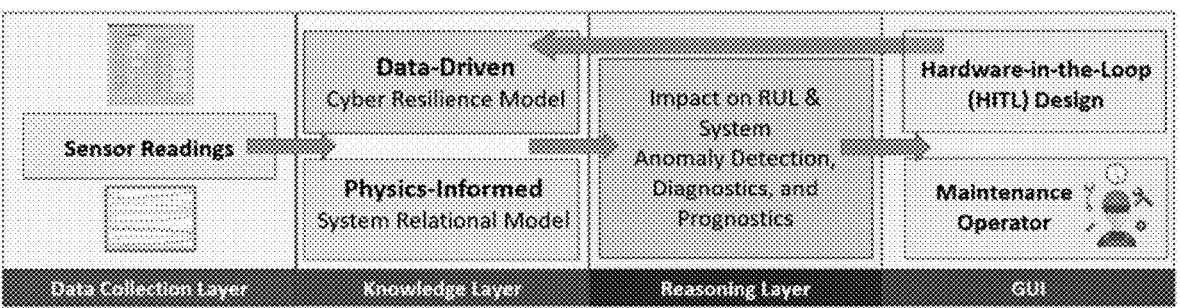
FIG. 1 depicts a schematic diagram illustrating an operational concept of a cyber resilience integrated security inspection system (CRISIS) according to various disclosed embodiments of the present disclosure.

Reference will now be made in detail to exemplary embodiments of the disclosure, which are illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the disclosure may be practiced.

These embodiments are described in sufficient detail to enable those skilled in the art to practice the disclosure and it is to be understood that other embodiments may be utilized and that changes may be made without departing from the scope of the disclosure. The following description is, therefore, merely exemplary.

Modern US Navy ships and submarines are configured with an ever-increasing level of automation, including state-of-the-art embedded wireless sensors that monitor vital system functions, such as, bridge systems, cargo handling and management systems, propulsion and machinery management and power control systems, access control systems, and navigation systems including Automatic Identification System (AIS), Global Positioning System (GPS), and Electronic Chart Display Information System (ECDIS). At the same time, cyber-attacks are increasing in frequency, impact, and complexity, with the potential for malicious acts or catastrophic damage to ship or submarine systems. For example, Vice Admiral William Hilarides, NAVSEA Commander wrote "There are little noticed cyber vulnerabilities on nuclear attack submarines like the Virginia-class boats that are slowly becoming the mainstay of the Navy's undersea fleet." In another example, a Department of Defense recent report argues that hacktivists, supported by some state-funded actors, can deploy malware when ships and submarines are in port and can become activated at sea to yield devastating results such as neutralizing operations, loss of life, defeat, or perhaps even catastrophic exchange of nuclear warheads.

Sensors including microcomputers are integrated into many ship and submarine machinery control systems, such as the main engine control circuitry. The sensors are potential targets for cyber-attacks and are susceptible to corruption through accidental events. In some cases, sensor data may be transmitted via unclassified networks to maintenance crews ashore. This makes the sensor network a point of vulnerability. In addition, malicious actors may access a submarine's information systems via computer terminals, network ports, or other computer equipment, causing substantial damages. The malicious actors may accomplish their objective using a variety of attack techniques, such as weather forecast spoofing, low-rate distributed denial-of-service (DDoS), and phishing.

The AIS is considered to be a soft target for cyber-attack because it does not have a built-in mechanism to encrypt or authenticate signals. For example, a closest point of approach (CPA) spoofing attack may involve faking a possible collision with a target. The spoofing attack will trigger a CPA alert, which could lead the ship off course to run aground or collide with a nearby ship. As another example, the spoofing attack may involve generating false distress beacons. Attackers (e.g., pirates) may rigger AIS search and rescue transponder (SART) alerts to lure victims into navigating to hostile and attacker-controlled areas. Many stealthy attacks, such as false data injection attacks (FDIAs), are difficult to detect on a condition-based predictive maintenance (CBPM) system, and may stealthily compromise measurements from sensors, bypass sensor's basic "faulty data" detection mechanism, and remain undetected. The FDIAs may be injected by compromised physical sensors, at sensor communication networks, and/or through data processing programs. Such attacks on the CBPM system may not even present their impact but may propagate from the sensors to the detection system to fool the CBPM system by predicting a delayed asset failure or maintenance interval instead. As a result, a significant cost may incur due to unplanned failure or loss of human lives in safety critical applications.

The present disclosure provides a cyber resilience integrated security inspection system (CRISIS) to improve the cyber-resiliency of the CBPM system. The CRISIS augments current onboard condition monitoring and maintenance processes to enhance fleet performance and readiness through improved equipment availability, reliability, security, and lifecycle operation and maintenance costs. The CRISIS communicates status to a monitoring system, provides options for solutions, and presents right alarms and information in a manner complementary to machine intelligence that does not overload human operators.

The state-of-the-art CBPM method applies analytics to detect anomalies and schedules maintenance only when needed. However, many CBPM applications are constrained by computing and power restrictions when deployed on wireless hardware. In these cases, the cybersecurity layer may be implemented effectively while minimizing the impact on power consumption and an overall lifespan of embedded sensors. While major advances in machine learning (ML) and augmented intelligence (AI) may be adopted to develop efficient algorithms to minimize vulnerabilities and improve cyber resiliency of internet-connected systems, stable versions of deep learning (DL) based techniques are still required for the CBPM system due to its complexity and criticality.

In the embodiments of the present disclosure, the CRISS includes both data-driven and model-based techniques to build a flexible and extensible cybersecurity layer incorporated into the CBPM system. FIG. 1 depicts a schematic diagram illustrating an operational concept of a cyber resilience integrated security inspection system (CRISIS) according to various disclosed embodiments of the present disclosure. As shown in FIG. 1, the CRISIS includes four layers: an input layer, a knowledge layer, a reasoning layer, and a graphic user interface (GUI) layer. The input layer collects and processes dynamic knowledge, such as on-board sensor data (e.g., from an accelerometer, a strain gauge, a thermometer, etc.), to extract features for a cyber resilience model. The input layer also gathers historical data from a variety of sources (e.g., system operator logs, sensory readings, hardware/software usage, etc.) using natural language processing to convert unstructured text data into concepts and relations that can be encoded in a cybersecurity knowledge base. The sensory data may be obtained using a commercial modular aero-propulsion system simulation (C-MAPSS) emulator.

The knowledge layer combines datasets from the input layer to develop comprehensive cyber resilience models based on machine learning (ML) techniques. Continuous and intermittent FDIAs are modeled in a generalized way and their impacts on the CBPM system are examined. Data-driven ML based models, such as long short-term memory (LSTM) and gated recurrent unit (GRU), are trained and detection performance of the models are evaluated.

The reasoning layer includes a graphical physics-informed Bayesian network model to represent the dynamic nature of the system maintained by the CBPM system. The model characterizes the condition-symptom relationships of different components and sensors and effectively reveals anomaly patterns such as the FDIAs with the corresponding sensor readings and trends.

The GUI layer integrates both software-in-the-loop (SITL) and hardware-in-the-loop (HITL) architectures to provide maintenance operators with a user-friendly interaction experience. The CRISIS supports the maintenance operators in combining data seamlessly, identifying potential attacks rapidly, and recommending detection and mitigation actions timely.

Generally, predictive maintenance (PdM) systems are often deployed in two major application scenarios: manufacturing pipeline, and mechanical and electrical industrial products. For example, a modern automotive pipeline includes a substantial amount of automatic apparatus. Failure of any one of the automatic apparatus may cause huge losses. An engine health monitoring system is another example of the PdM application in the industrial product. In both application scenarios, functionality of the entire system depends on the substantial amount of individual components, and the PdM systems allow timely and corrective maintenance for the individual components. For example, replacement parts may be ordered in advance to avoid hazardous failure of the entire system.

The engine health monitoring system utilizes wireless sensors to collect running status of a ship engine which is an extremely complex system and requires timely maintenance. Readings of the wireless sensors are indicators of the health of the ship engine and are transmitted over a wireless network to a central engine controller, where a remaining useful life (RUL) of the ship engine is predicted by prediction models to guide an engine manufacturer to maintain the ship engine as the RUL approaches an end of life. Various models, such as fuzzy models, big data frameworks, and deep learning-based models, have been used to accurately implement the PdM systems.

The FDIAs were discovered originally in smart grid industry. An FDIA attacker often compromises sensor readings in such a tricky way that undetected errors are induced into the calculation of state variables and values. The widespread adoption of Internet of Everything (IoE) or Internet of Things (IoT) makes cybersecurity a necessity rather than an accessory. The attacks become more and more sophisticated.

The FDIAs often cause a huge impact on the PdM systems. False data injection in an IoT network may mislead the deep learning-based PdM systems to make a false prediction. The FDIAs are able to successfully fool the LSTM and GRU networks to incorrectly predict the RUL values in the C-MAPSS dataset. Thus, the FDIAs may substantially impact all PdM deep learning models including convolutional neural networks (CNNs), LSTM networks, and GRU networks.

The FDIAs compromise a PdM system by changing predictions made by a machine learning model. For example, the predicted RUL may be changed to be longer or shorter than its true value, thereby causing losses. However, it is difficult to detect or prevent the FDIAs on the machine learning models in real-life PdM systems. In the present disclosure, recurrent neural networks (RNNs) are used to detect the FDIAs in C-MAPPS dataset.

RNN includes an artificial neural network (ANN) architecture with loops. RNNs are often used for processing sequential signals by introducing a memory mechanism. For example, dependency information in the sequences may be explored and representations of the sequences that distinguish the sequences without manually designing features are learned. An RNN cell includes a signal of a current step as one input and a hidden state generated by the same RNN cell in a preceding step as another input. The RNN cell conveys historical information of a sequence by merging a current input into a hidden state and passes a merged result to an RNN cell of a succeeding step.

LSTM and GRU networks are two types of RNNs that are dedicated to overcome blow-up or vanishing gradient problems in training standard RNNs. In addition to the hidden state in an ordinary RNN cell, the LSTM network introduces a cell state that acts like a "highway" of the gradient by avoiding interaction of nonlinearities with backpropagation. Moreover, the LSTM network employs multiple gates with nonlinearities to increase an expressive power of the LSTM network. The GRU network simplifies computation and architecture of the LSTM network but shares similar ideas. In the present disclosure, the LSTM and GRU networks are used to detect the FDIAs in the PdM systems.

Figure 2:
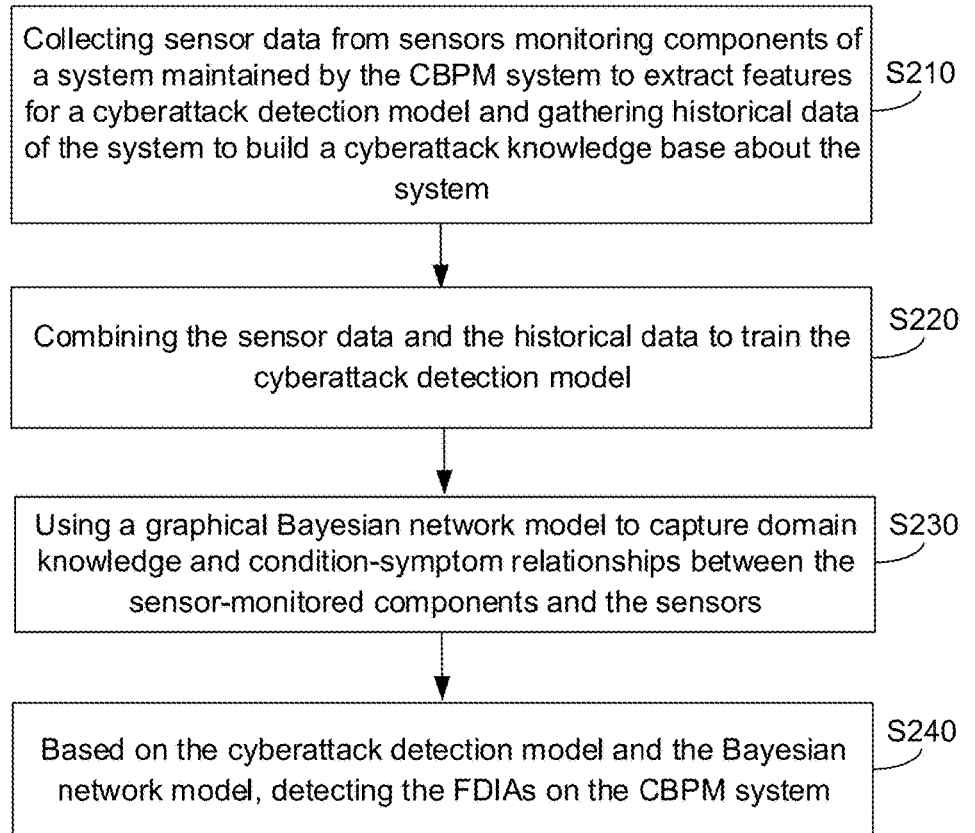
FIG. 2 depicts a flowchart illustrating a method for detecting false data injection attacks (FDIAs) on a condition-based predictive maintenance (CBPM) system according to various disclosed embodiments of the present disclosure.
Figure 3A:
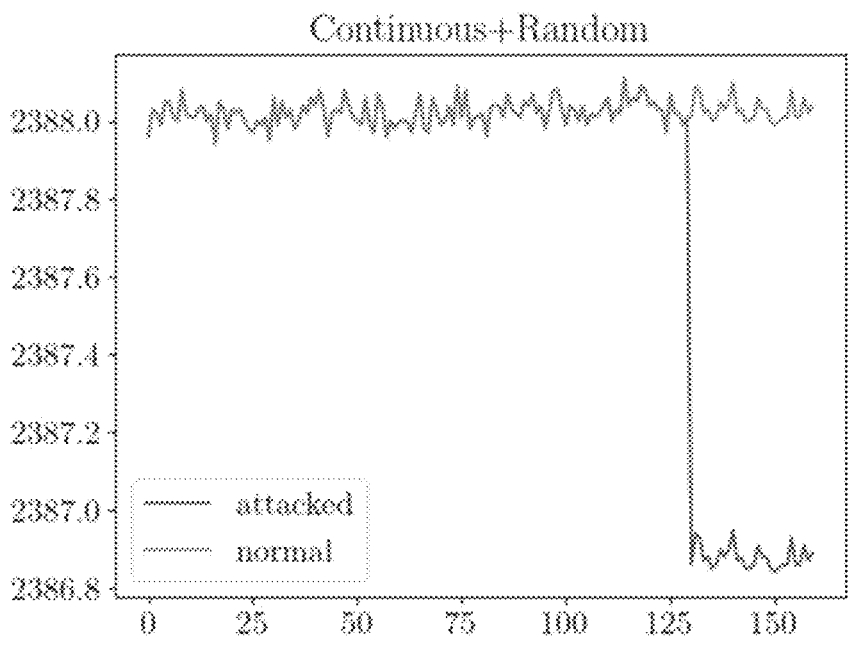
FIGS. 3A-3D depict schematic diagrams illustrating exemplary attacks according to various disclosed embodiments of the present disclosure.
Figure 3B:
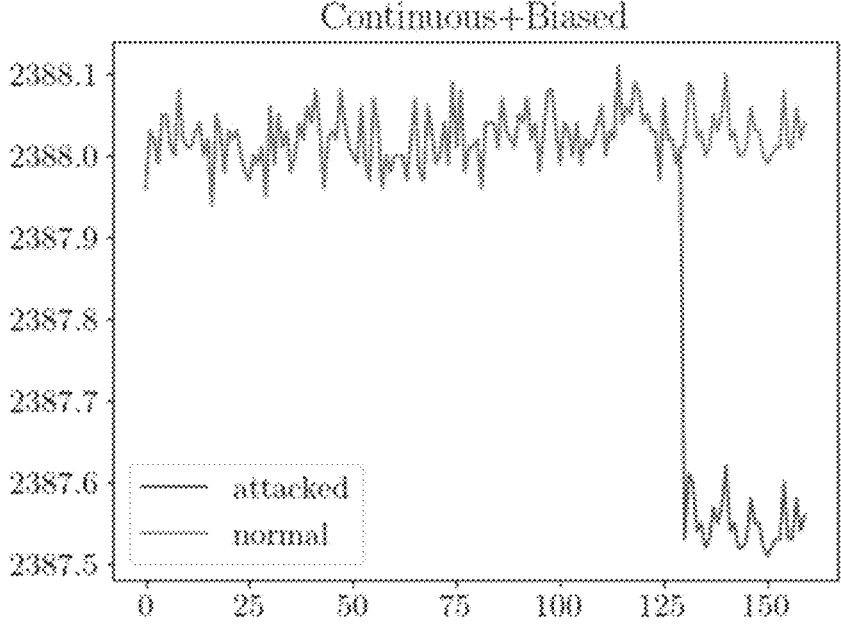
Figure 3C:
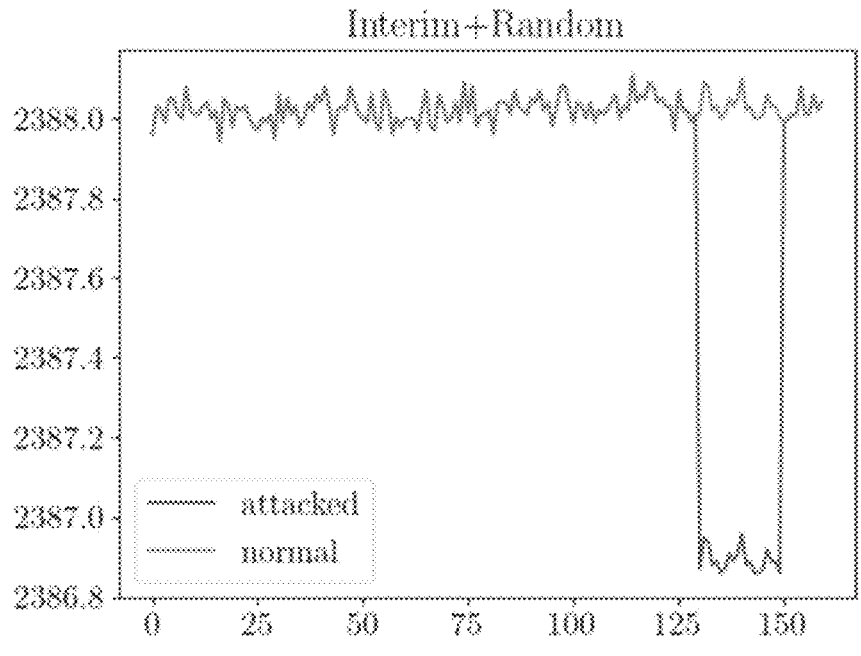
Figure 3D:
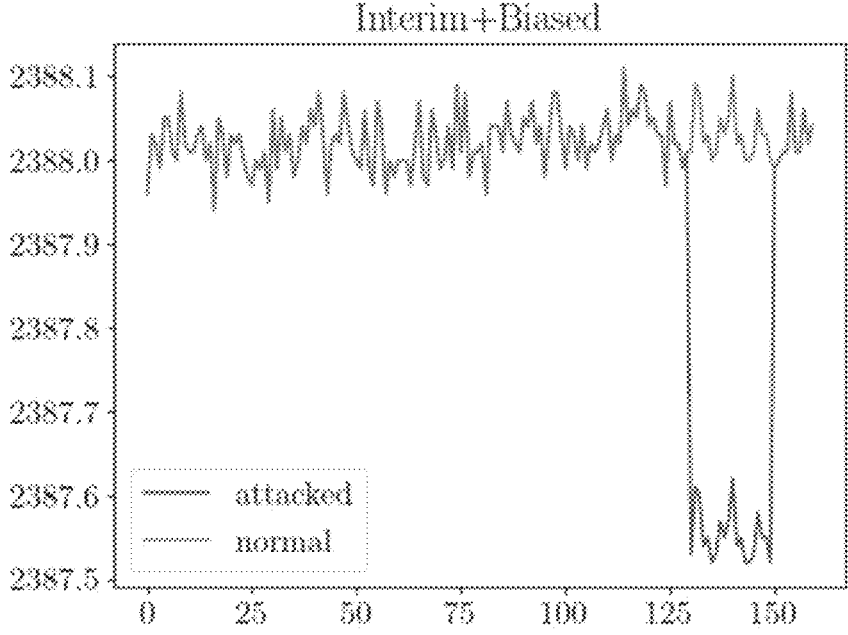
Figure 4A:
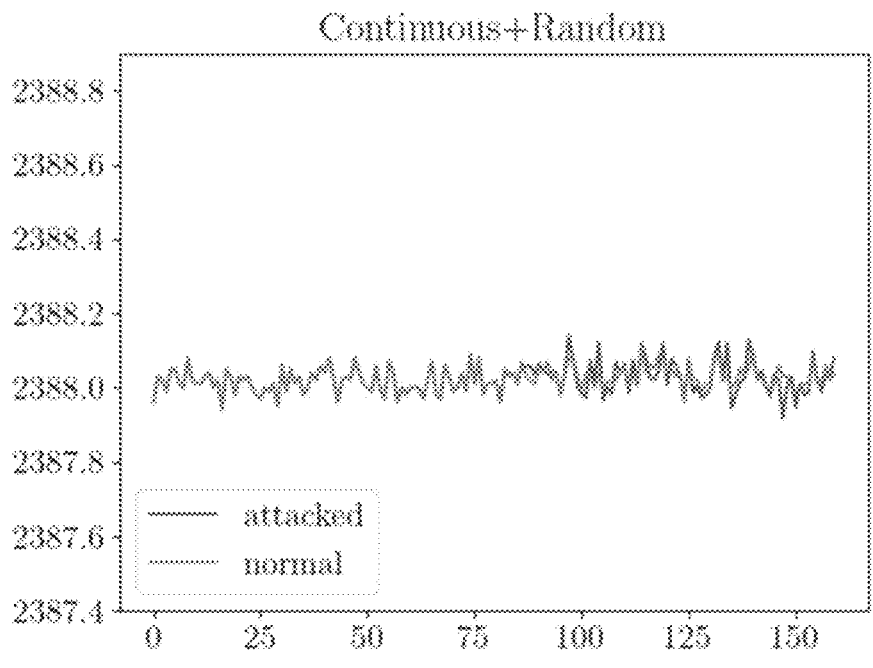
FIGS. 4A-4D depict schematic diagrams illustrating exemplary attacks according to various disclosed embodiments of the present disclosure.
Figure 4B:
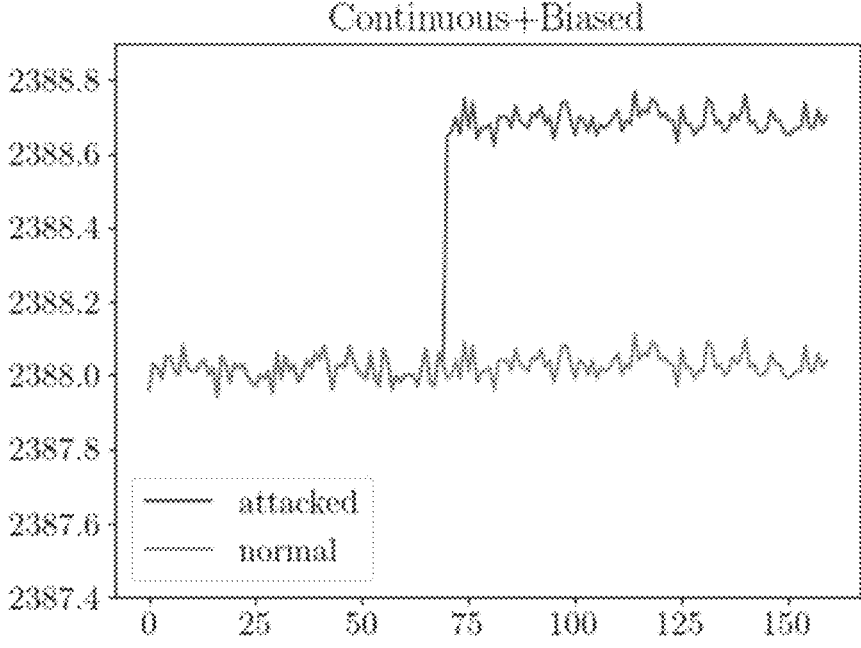
Figure 4C:
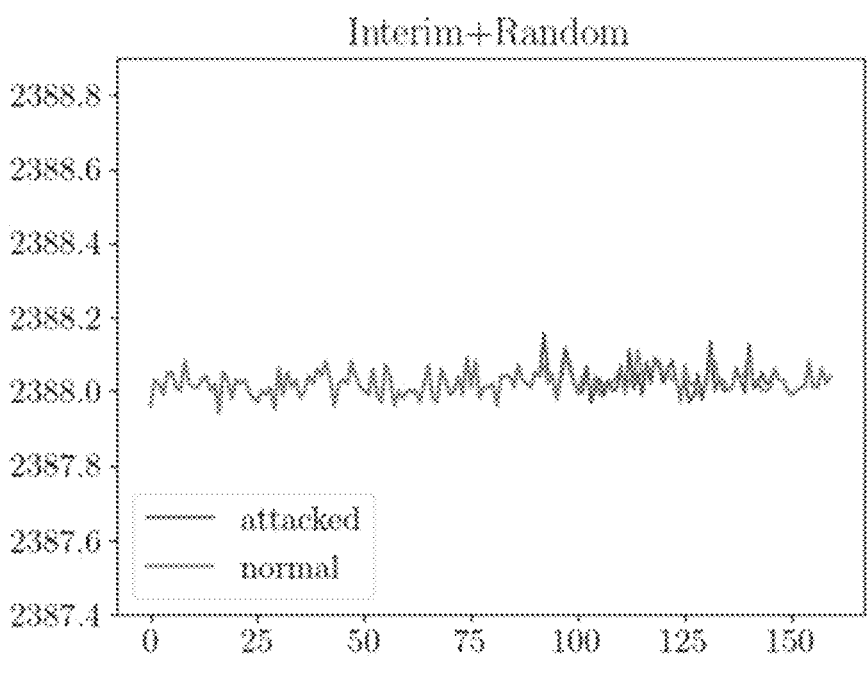
Figure 4D:
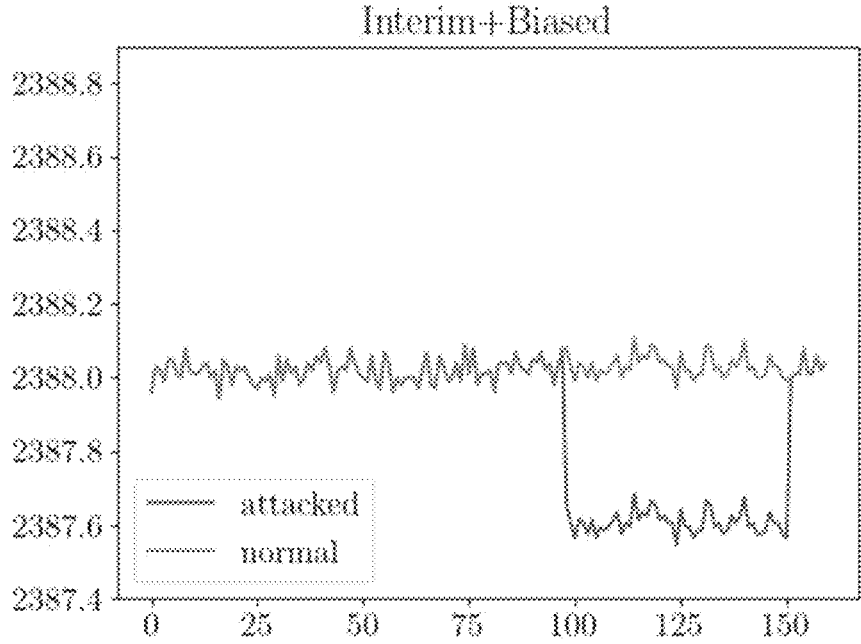

The present disclosure provides a method for detecting the FDIAs on the CBPM system. The CBPM system maintains the system, such as a navy ship or submarine. The method protects the CBPM system from the cyberattacks such as the FDIAs. The FDIAs include continuous and intermittent FDIAs. FIG. 2 depicts a flowchart illustrating a method for detecting the FDIAs on the CBPM system according to various disclosed embodiments of the present disclosure. As shown in FIG. 2, the method includes the following processes.

At S210, sensor data is collected from sensors monitoring components of a system maintained by the CBPM system to extract features for a cyberattack detection model, and historical data of the system is gathered to build a cyberattack knowledge base about the system.

In this case, the cyberattack detection model is configured to detect the FDIAs on the CBPM. The cyberattack detection model can be expanded to detect other intrusions and attacks when additional aspects and data of the system maintained by the CBPM system are incorporated.

In some embodiments, the sensor data is the on-board sensor data obtained from the sensors that monitor components of the system. The components of the system include a compressor and a turbine engine. The sensor data includes readings of one or more of an accelerometer, a strain gauge, a thermometer, etc. The historical data is unstructured text data including one or more of a system operator log, hardware information, and software information. After the historical data is gathered, natural language processing is performed on the historical data to convert the unstructured text data into concepts and relationships. A cyberattack knowledge base about the system can be built based on the concepts and the relationships.

At S220, the sensor data and the historical data are combined to train the cyberattack detection model.

In some embodiments, the sensor data and the historical data are combined to train the cyberattack detection model based on the ML techniques. The cyberattack detection model includes the LSTM mode and the GRU model. The trained cyberattack detection model can be used to process the sensor data in real-time to detect the FDIAs.

In some embodiments, each sensor corresponds to a separate cyberattack detection model. The sensor data obtained from each sensor is used to train the corresponding cyberattack detection model. The separately trained cyberattack detection model can be used to process the sensor data obtained from each sensor in real-time to detect which sensor is attacked by the FDIAs.

At S230, a graphical Bayesian network model is used to capture domain knowledge and condition-symptom relationships between the sensor-monitored components and the sensors.

In some embodiments, the graphical Bayesian network model includes a plurality of nodes connected by a plurality of links to represent the physical structure of the system. The domain knowledge includes technical manuals and mathematical engine models that describe the components of the system, how the components are connected, which characteristics of the system are measured by the sensor, and how the system works. The domain knowledge provides a topological structure for the graphical Bayesian network model. The condition-symptom relationships determine weights of the plurality of links between the plurality of nodes of the graphical Bayesian network model. Thus, the graphical Bayesian network model represents the dynamic nature of the system maintained by the CBPM system and is able to reveal the anomaly patterns such as the FDIAs.

At S240, the FDIAs on the CBPM system are detected based on the cyberattack detection model and the graphical Bayesian network model.

In some embodiments, both the cyberattack detection model and the graphical Bayesian network model are used to process the sensor data in real-time to detect the FDIAs on the CBPM system. The data-driven and physics-informed approach of combining the cyberattack detection model and the graphical Bayesian network model makes the detection of the FDIAs on the CBPM system more accurate and more efficient.

Further, the method for detecting the FDIAs on the CBPM system may be integrated with the CBPM system to display each sensor being attacked by the FDIAs, detect the GNSS and AIS spoofing, detect the channel access attacks on the CBPM system, and predict the effect of the FDIAs on the RUL of the system and make maintenance recommendation.

The FDIA attacks include four types: interim-random, interim-biased, continuous-random, and continuous-biased. The "interim" and "continuous" indicate duration of the FDIA attacks. The interim attacks last about 20 time cycles. The continuous attacks start at d time cycle and continue to the end-of-life of the engine. The biased attacks add a constant amount of shift to the sensor output. The random attacks add a noise having a small range to the sensor output.

FIGS. 3A-3D depict schematic diagrams illustrating exemplary attacks according to various disclosed embodiments of the present disclosure. Samples satisfying the following assumptions are selected from an exemplary C-MAPSS dataset. The assumptions include the following. The attacks are applied to three specific sensors out of 21 sensors. The attacks are all initiated at the $130^{th}$ time cycle. The duration of the interim attack lasts 20 time cycles. The shift of the biased attacks is always negative. The range of the noise that random attacks inject has a range of approximately 0.01%-0.05%. As such, 37 samples are selected from the dataset.

In some embodiments, an RNN model is used to detect the FDIAs in the same dataset described above. The 37 attack samples are distributed in 707 normal samples in the dataset. 683 normal and attack samples (i.e., 80%) are used as a training dataset and 172 normal and attack samples (i.e., 20%) are used as a test dataset.

Two different RNN models, that is, the LSTM model and the GRU model, are included in Table 1 below. In this case, all sensor readings are used. The number of training epochs is 60. The initial learning rate is $1 \times 10^{-3}$. The optimizer is a stochastic optimizer.

TABLE 1

| LSTM | |
| --- | --- |
| Loss | Cross-entropy |
| Linear | Linear (in_features = 64 (or 16), out_features = 2, bias = True) |
| RNN cell | LSTM (in_features = 21 (or 1), out_features = 64 (or 16), num_layers = 2, dropout = 0.5) |
| GRU | |
| Loss | Cross-entropy |
| Linear | Linear (in_features = 64 (or 16), out_features = 2, bias = True) |
| RNN cell | GRU (in_features = 21 (or 1), out_features = 64 (or 16), num_layers = 2, dropout = 0.5) |

Figure 5:
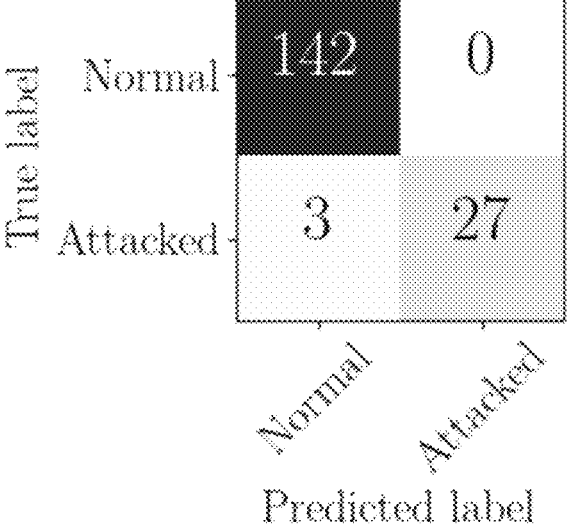
FIG. 5 is a confusion matrix of the LSTM model on an exemplary dataset according to various disclosed embodiments of the present disclosure.

In Table 1, the input dimensionality of the RNN cells can be 21 or 1 depending on inputting all 21 sensor readings or one sensor reading in different scenarios. Similarly, the output dimensionality of the RNN cells and the input of the linear layer depends on the scenarios. The confusion matrix of the LSTM model for the dataset is shown in FIG. 5. The test accuracy of the GRU model is 100%. Both the LSTM model and the GRU model achieve high test accuracy. In this case, the attacks are strong and easy to be detected.

In some embodiments. More generalized FDIAs are used in testing. The assumptions for more generalized FDIAs include the following. The attacker observes the sensor readings for a certain amount of time, for example, at least 20% of a length of the sequence. Two sensors are randomly selected as attack targets. Sensors that have constant readings during the observation are excluded. The attacks are initiated at a random time cycle after the observation. The duration of the interim attacks is randomly selected in the range of 10%-40% cycles out of the total length of the sequence. The shift of the boas added to the attacks can be negative or positive with 50% probability, respectively. In the random attacks, the standard deviation of the injected noise is the same as during the observation. In the biased attacks, the shift of the bias added to the attacks is in the range of 0.01%-0.05% of the mean value during the observation. Table 2 below shows a comparison of the assumptions.

where m is the number of the attacked sensors, and C denotes the combination number.

In some embodiments, the classification problem can be converted into a regression problem. For example, the attacked sensor outputs are labeled as "1"s and the normal sensor outputs are labeled as "0"s. The prediction of a classification model is a 21-dimensional binary vector that indicates the sensors are attacked or not. It is attempted to use the LSTM model and the GRU model to approximate this distribution. Because the output space is too complicated, it is unsuccessful even when m=2.

Figure 7:
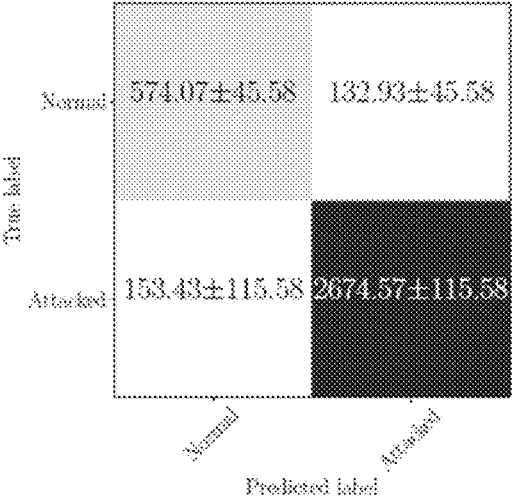
FIG. 7 is a confusion matrix of the GRU model on detecting generalized FDIAs for an individual sensor according to various disclosed embodiments of the present disclosure.

To simplify the complexity of the output space, the sensors are individually separated. One model is trained for each sensor output to determine whether the sensor is attacked. It is assumed that the sensors having the constant outputs are not attacked and are excluded. Thus, 14 models are trained for the remaining sensors. In a one-model-for-each-sensor approach, the LSTM model fails to converge in the training of detecting the FDIAs only for three sensors. The training result of the GRU model is shown in FIG. 7. In

TABLE 2

| New Assumptions | The Assumptions in [8] |
|---|---|
| The attacked sensors are randomly selected (sensors with constant reading are not attacked) | Attacked sensors are fixed. |
| The attacker observes in the first 20% of the time cycles. The attacks are initialized randomly in the remaining sequence. | The attacks always start at the 130-th time cycle. |
| The duration of the interim attacks is random selected in the range of 10%-40% cycles out of the total length. | The duration of the attack is fixed in the interim mode (80 cycles). |
| The shift bias is either positive or negative with 50% probability. | The shift of bias is always negative. |
| In the random attacks, the standard deviation of the injected noise is the same as the observations. | The base of the shifted percentage for the biased attacks is not specified. |
| In the biased attacks, the shifted bias is 0.01%-0.05% of the observations. | |

FIGS. 4A-4D depict schematic diagrams illustrating exemplary attacks according to various disclosed embodiments of the present disclosure. The attacks are more general. Stealthiest attack scenarios and worst cases are considered. Without constraints on the duration of the attacks, each sequence may be attacked regardless of its length. The training dataset including 709 engine IDs of the C-MAPSS is used to generate 2,836 attacked sensor output sequences for four FDIA scenarios with the generalized assumptions. Similarly, the test dataset includes 707 engine IDs with normal sequences and 2,828 attacked sequences.

Figure 6A:
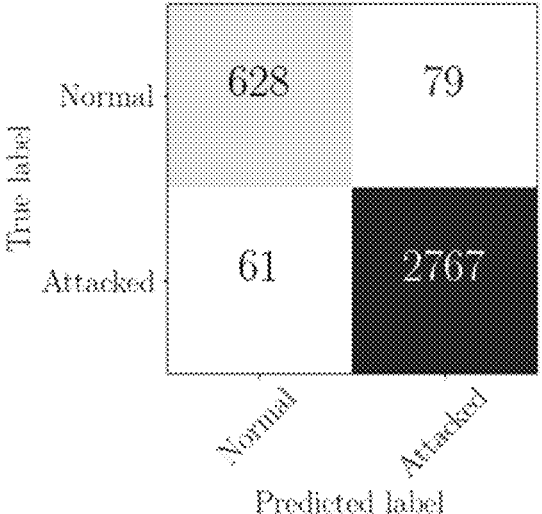
FIG. 6A is a test confusion matrix of the LSTM model on detecting generalized FDIAs according to various disclosed embodiments of the present disclosure.
Figure 6B:
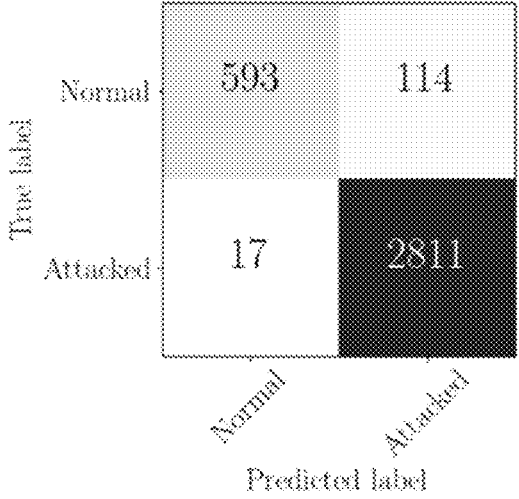
FIG. 6B is a test confusion matrix of the GRU model on detecting generalized FDIAs according to various disclosed embodiments of the present disclosure.

The training dataset is used to train both the LSTM model and the GRU model. The test results are shown in FIG. 6. The accuracies for the LSTM model and the GRU model are 96.04% and 96.26%, respectively. The sensitivities for the LSTM model and the GRU model are 97.84% and 99.40%, respectively. The specificities for the LSTM model and the GRU model are 88.82% and 83.87%, respectively. In this case, all 21 sensor outputs are used as inputs for the two models, that is, in_feature=21, out_feature=64, and the linear layer in_feature=64. As shown in FIG. 6, the detection accuracy decreases because the attacks are more generalized.

The LSTM model and the GRU model are able to detect generalized attacks. The next step is to detect the attacked sensors. The complexity of the output space for detecting which sensors are attacked is $$C_{21}^m,$$

this case, one model accepts one sensor output at each time cycle, that is, in_feature=1, out_feature=16, and the linear layer in_feature=16. The average sensitivity is 94.57%, and the average specificity is 81.20%.

The major difference between training on all sensor outputs together and training single sensor output individually is that the dependency information between the sensor outputs is unavailable if they are separated. In this case, the accuracy for detecting the FDIAs decreases further. Thus, the dependency of the sensor outputs plays an important role in detecting the FDIAs. Although training one model for each sensor output makes detecting which sensor is attacked feasible, missing the dependency information between the sensor outputs decreases the detection accuracy.

Figure 8:
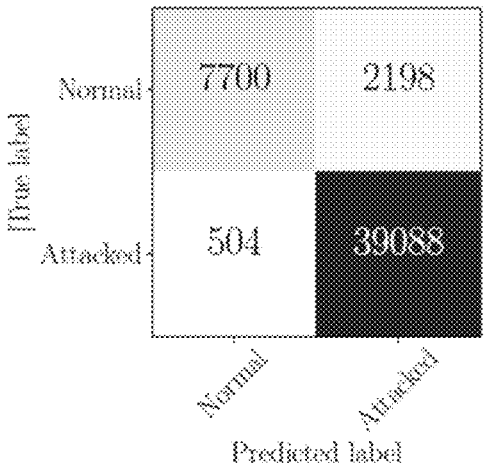
FIG. 8 is a confusion matrix of the GRU model on detecting generalized FDIAs for all sensors according to various disclosed embodiments of the present disclosure.

Training one model for each sensor requires testing the sequence by using multiple models (e.g., 14 models in C-MAPSS dataset) every time a new sensor reading arrives. This is computationally expensive. As the data normalization is a routine procedure before the data is fed to the models, a dynamic range of the sensor outputs does not matter. It is reasonable to consider all the sensor outputs obey one complex distribution. Thus, one model is used to learn the distribution. In this case, a GRU model is trained to distinguish the attacked sequences for each senor output. The training procedure remains the same as previously described. But all sensor outputs are combined into one dataset and only one model is used to learn on the dataset. In some embodiments, the training dataset includes 49,630 (i.e., 709×14×5) samples, and the test dataset includes 49,490 (i.e., 707×14×5) samples. The confusion matrix for detecting the FDIAs by training one GRU model for all sensor outputs is shown in FIG. 8. The overall classification accuracy is 94.54%. The sensitivity is 98.72%. The specificity is 77.79%. Because the sensor outputs are separated, the dependency information between the sensors is not available to the learning model. In this case, the specificity is not as high as in FIG. 6.

In addition to finding out which sensor is attacked, quickly detecting an FDIA is another objective. The continuous-biased attacks shown in FIG. 4 are used to evaluate the performance of the RNN model. The attack is defined in the equation below:

$$S_i^a = \begin{cases} S_i^n & i < d \\ S_i^n + N_i + c & d \le i \le n \end{cases},$$

where $$S_i^n \text{ and } S_i^a$$

denote a value of ith cycle in a normal and attacked sensor output, respectively ($1 \le i \le n$), $N_i \sim \mathcal{N}(0,\sigma)$ is a white noise with zero mean and standard deviation that is described in Table 2, c is a shift bias, and d is the time cycle when the attack is initiated. For simplicity, let $d = \lfloor 0.2n \rfloor$.

Figure 9:
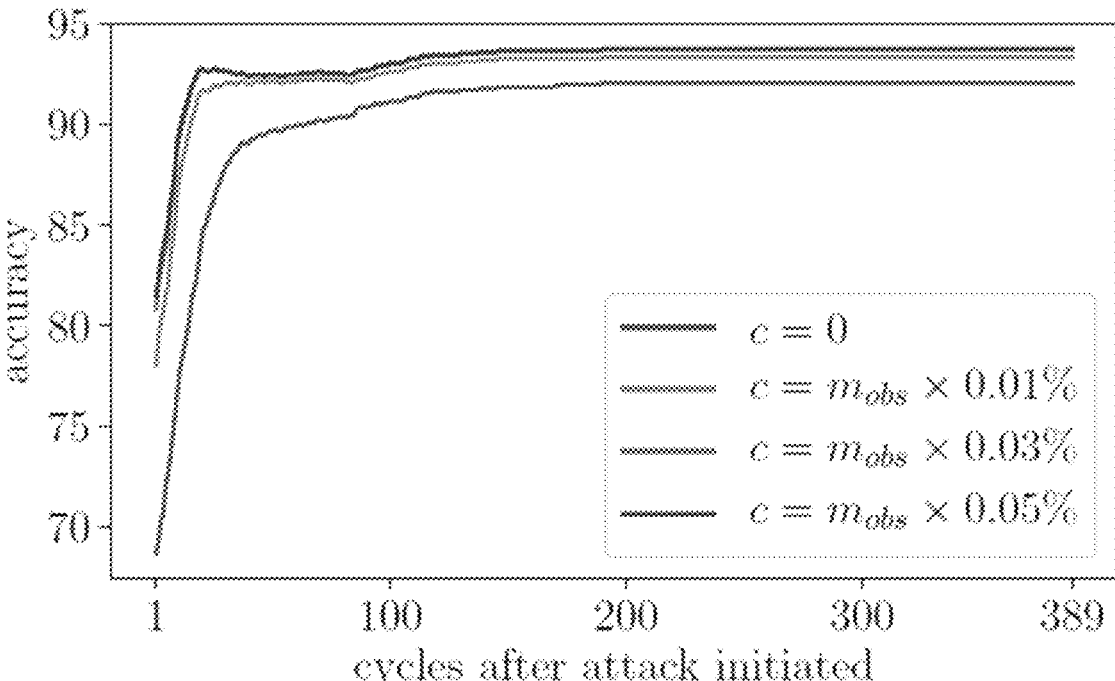
FIG. 9 depicts a schematic diagram illustrating accuracy versus attack intensity according to various disclosed embodiments of the present disclosure.
Figure 10:
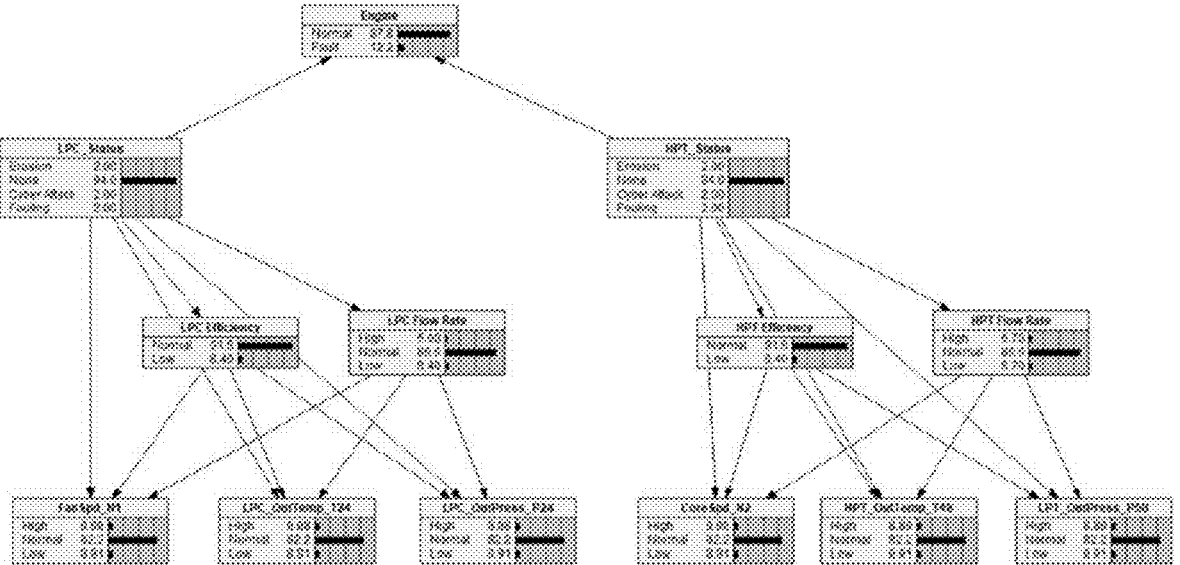
FIG. 10 depicts a schematic diagram illustrating an exemplary graphical Bayesian network model for a turbofan engine according to various disclosed embodiments of the present disclosure.

Among these parameters, c represents an intensity of the attack. For example, c is zero for stealth attacks. To examine an impact of c to how soon the FDIA can be detected, c is set to 0, $m_{obs} \times 0.01\%$, $m_{obs} \times 0.03\%$, or $m_{obs} \times 0.05\%$, where $$m_{obs} = \frac{1}{d} \Sigma_1^d S_i^n,$$

which is an average of the observations before the attack is initiated. The GRU model trained for detecting the generalized FDIAs is used to examine how soon the FDIAs with different intensities (c) are detected. The results are shown in FIG. 9. As shown in FIG. 9, nearly 70% of the attacks can be detected in the first three cycles even in the stealthiest scenario. As the attack intensity increases, the attack can be detected sooner. About 85% of the attacks can be detected in six to eight cycles in the cases that have stronger attacks. However, the plot of $c = m_{obs} \times 0.03\%$ overlaps the plot of $c = m_{obs} \times 0.05\%$, indicating that the accuracy no longer increases after the attack intensity reaches a certain level (e.g., $c = m_{obs} \times 0.03\%$).

In some embodiments, the graphical Bayesian network model is used to represent the dynamic nature of the CBPM system and predict potential cyberattacks. The graphical Bayesian network model encodes the domain knowledge and the condition-symptom relationships of different plant components and sensors, serves as a baseline physics-informed model for reference and comparison, and also serves as a model to analyze simulated data obtained from data acquisition (DAQ) for any portion of the system by generating sampling data from the roots of the graphical Bayesian network model. The sampling data can then be used for testing or constructing a probabilistic knowledge graph model.

The static knowledge from the technical manuals and the mathematical engine models describe the components of the system, how the components are connected, which characteristics of the system are measured and displayed, and how the overall system works. These relationships are more deterministic in nature and provide the topological structure of the graphical Bayesian network model and the condition-symptom relationships. The dynamic and noisy information regarding the condition-symptom relationships that are non-deterministic is represented by weight or probability of occurrence and is encoded in the links between the different nodes of the model. Trending data and rules regarding indications of possible cyberattacks can also be modeled for prognostics.

Because limited public data repositories exist for predictive maintenance for the deep learning of a data-driven model, the sensor data from C-MAPSS is leveraged. The sensor data meets the requirements of a suitable system model that allows input variations of health-related parameters and recording the resulting output sensor measurements.

The graphical Bayesian network model is a physics-informed mode for representing knowledge about uncertainties. It is based on the Bayesian approach of probability and statistics, which takes into account prior belief and uses probability inference to update belief based on observed evidence. The graphical Bayesian network model includes direct acyclic graphs that contain nodes representing hypotheses or states, arcs representing direct dependency relationships among the hypotheses, and conditional probabilities that encode the inferential force of the dependency relationship.

C-MAPSS produces a total of 21 different sensor outputs. Of these 21 outputs, only selected first level sensor components are monitored by a control logic as the input sensors in the graphical Bayesian network: $N_1$, $N_2$, $P_{20}$, $T_{20}$, $T_{24}$, $P_{s30}$, $T_{48}$, $T_{50}$, and $P_{50}$. These sensors form fundamental information states of the graphical Bayesian network model.

The graphical Bayesian network model is developed for cyberattack condition-symptom analysis to assist in the detection of the FDIAs on system sensor readings. The graphical Bayesian network model focuses on major engine components of a compressor and a turbine engine. The effects of various faults on engine component degradation are reflected in flow capacity and isentropic efficiency. Two common causes of deterioration chosen to model here are erosion and fouling. Generally, the compressor fouling and erosion decrease both air flow and turbine efficiency. But the compressor erosion causes an increase in flow capacity. These effects are detected by changes in temperature and pressures as shown in the h-s diagram. The flow is proportional to the square root of the temperature over the pressure, and the efficiency is the ratio of the affected flow to the undeteriorated flow.

Figure 11:
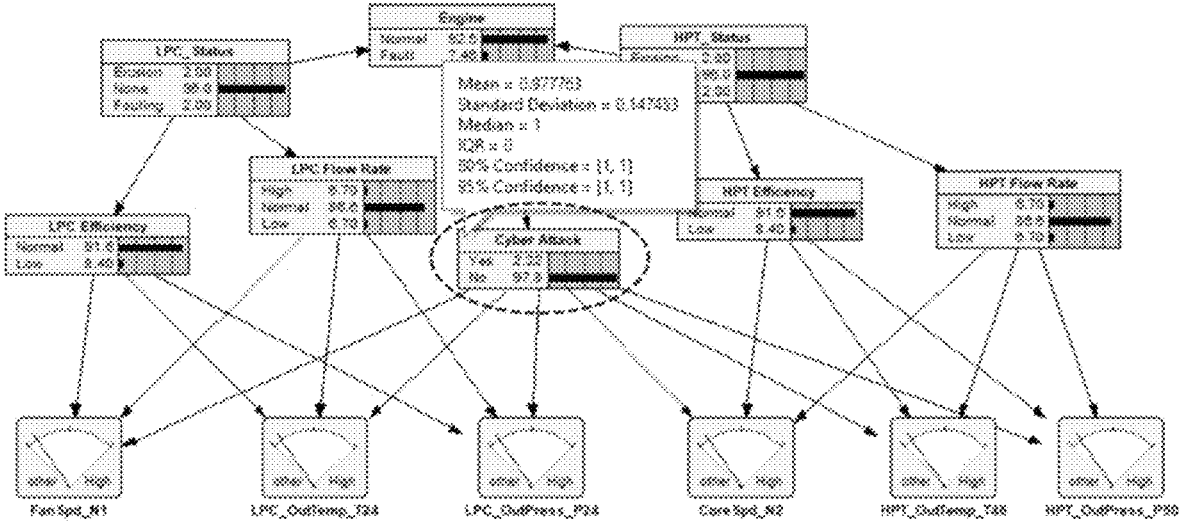
FIG. 11 depicts a schematic diagram illustrating an exemplary graphical Bayesian network model for a gas turbine engine in a normal operation state according to various disclosed embodiments of the present disclosure.
Figure 12:
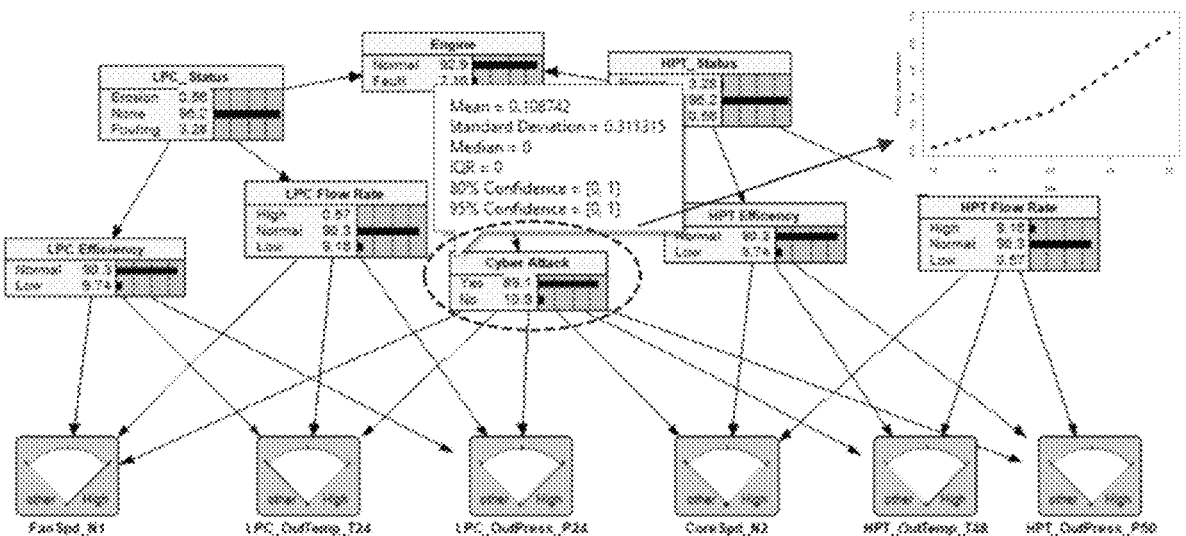
FIG. 12 depicts a schematic diagram illustrating an exemplary graphical Bayesian network model for a gas turbine engine in a cyberattack state according to various disclosed embodiments of the present disclosure.

The graphical Bayesian network model of the engine shown in FIG. 11 and FIG. 12 has two states: a normal state and a fault/attack state. Two primary components are represented by the nodes "LPC_Status" and "HPT_Status". The components have four states: a normal operation state, a blade fouling state, a blade erosion state, and a cyberattack state. The measurements associated with the two components include a temperature, a pressure, and an associated shaft speed. The conditional probability tables associated with each measurement node reflects that: 1) the fouling causes an increase in the temperature, the pressure, and the shaft speed; 2) the erosion causes a decrease in the temperature, the pressure, and the shaft speed; and 3) an increase in one reading and a decrease in another are inconsistent and indicate a potential cyberattack.

For example, as shown in FIG. 12, the low fan speed, the high $T_{24}$, and the low $P_{24}$ are inconsistent with expected system behavior, which results in an increased probability of a cyberattack (e.g., about 89%). About 89% is much greater than a normal probability of about 2.2% for the expected readings of an engine suffering from compressor fouling, as shown in FIG. 11. In the case shown in FIG. 11, the engine has a high probability of normal functioning even though there are out of normal readings. In the case shown in FIG. 12, the engine has an over 89% chance of being in the fault/attack state.

Figure 13:
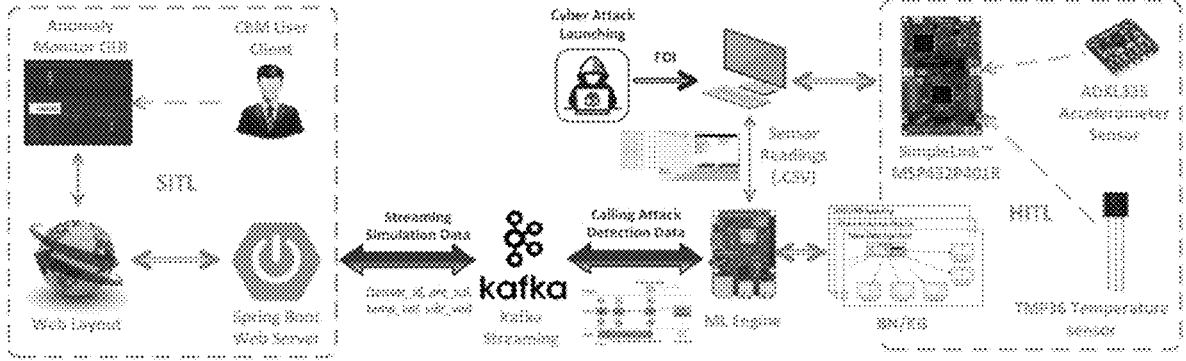
FIG. 13 depicts a structural diagram illustrating a cyber resilience integrated security inspection system (CRISIS) against the FDIAs according to various disclosed embodiments of the present disclosure.

The present disclosure also provides a cyber resilience integrated security inspection system (CRISIS) against the FDIAs. The CRISIS supports real-time system aware monitoring. The CRISIS can simultaneously process the sensor data in streaming and batch processing mode and provide scalable predictive maintenance with different data volumes and complexity. FIG. 13 depicts a structural diagram illustrating a cyber resilience integrated security inspection system (CRISIS) against the FDIAs according to various disclosed embodiments of the present disclosure. As shown in FIG. 13, the CRISIS includes a front-end server and a back-end server.

In some embodiments, the CRISIS receives the sensor data from different types of assets. Each asset may contain several subsystems. In order to provide predictive maintenance on a fleet level, multiple models with similar structures but different parameters are constructed and implemented at the same time. Ongoing maintenance activities may be dynamically updated in the cyberattack knowledge base for subsequent maintenance planning. The implementation of the CRISIS is a hybrid design including a software-in-the-loop (SITL) module and a hardware-in-the-loop (HITL) module to support multiple tasks.

As shown in FIG. 13, the CRISIS includes the HITL module coupling with the data acquisition (DAQ) subsystem of the CBPM system or the components. The sensor data is collected using a multichannel embedded sensor node configured to monitor a pressure, a temperature, an angular position, and an acceleration for a gas turbine engine. The CRISIS includes transducers to instrument the test stand and monitors both process-related and dynamic responses using a lower power data acquisition circuit. The sensor node includes a microcontroller, such as Texas Instruments' MSP432 to provide on-board signal conditioning, data storage, signal processing, analysis, and data transmission through wired or wireless interfaces. The sensor node may be powered by an internal primary or rechargeable battery, an external DC power supply, or an external multi-source energy harvesting system, with acceptable supply voltages approximately between 3.3V DC and 5.5V DC.

Figure 14:
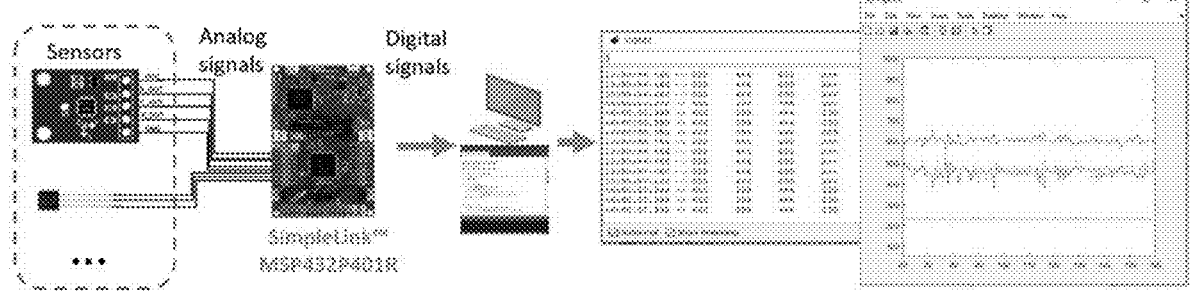
FIG. 14 depicts a schematic diagram illustrating a hardware-in-the-loop workflow according to various disclosed embodiments of the present disclosure.

For example, as shown in FIG. 14, the sensors send analog signals to the microcontroller. The microcontroller converts and processes the analog signals from the sensors into digital signals, and sends the digital signals to a computer for further processing. A window of COM3 shows the digital signals received by the computer. A window of FIG. 2 shows the digital signals in a graphic form.

In some embodiments, as shown in FIG. 13, the CRISIS includes the cyberattack detection model and the graphical Bayesian network model between the SITL module and the HITL module. For example, a Raspberry Pi is used to integrate the cyberattack detection model, the graphical Bayesian network model, and Kafka streaming for real-time data acquisition and cyberattack detection. The simulated data will be streamed to the front-end server (e.g., the SITL module) for GUI display.

As shown in FIG. 13, a web-based GUI is implemented to show the predicted RUL and RUL distribution for ship engines, provide accurate detection regarding possible cyberattack situations and defective components, and further present maintenance recommendations. In addition, a series of application programming interfaces (APIs) are implemented to provide an interface to other web service systems. The CRISIS can be standalone or integrated with other systems to provide services via the web. This interface provides two sections for a user to view the conditions and predictive maintenance of the ship. One section includes a summary table including all the ships in the maintenance depot with an indicator indicating a current status of each ship. The indicator indicates one of four statuses: a normal status, a recommended maintenance status, a failure alert—waiting maintenance status, and an in-maintenance status.

Figure 15:
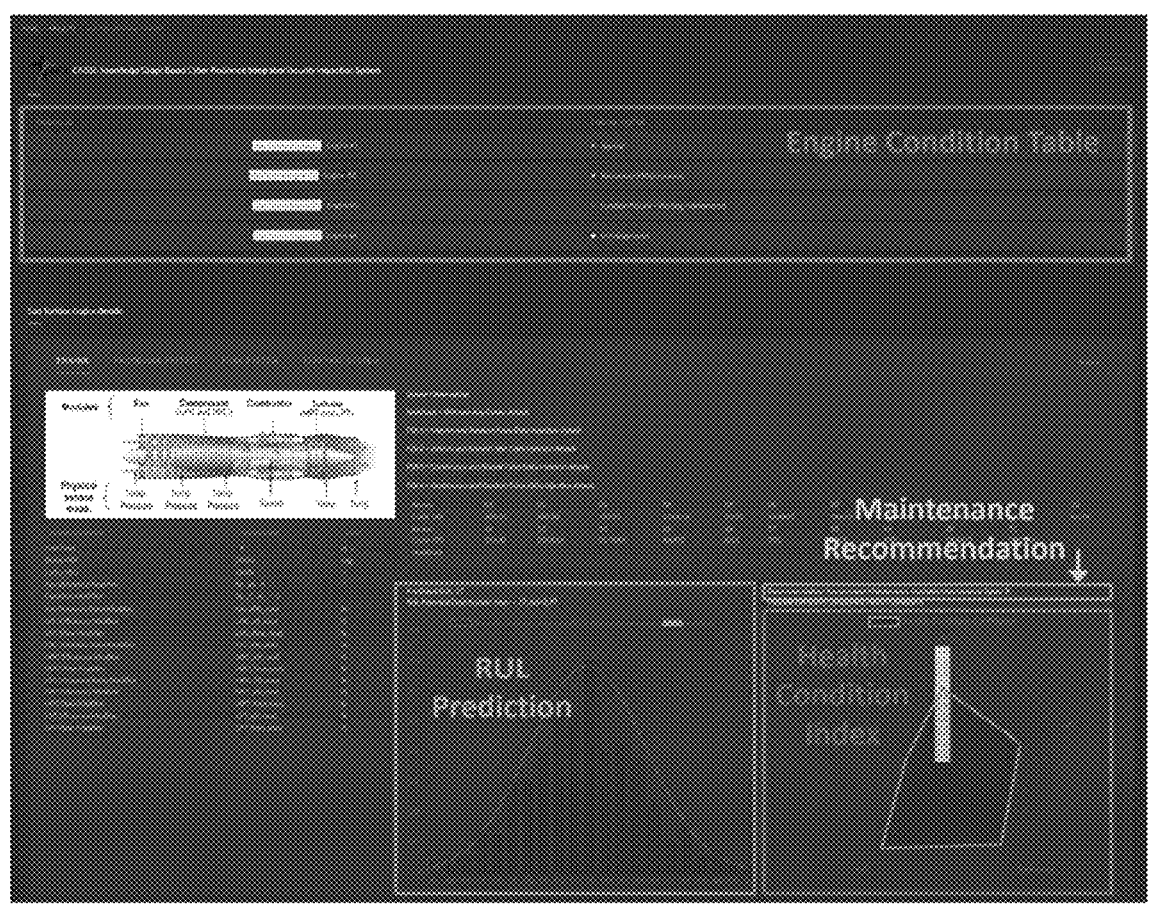
FIG. 15 depicts a schematic diagram illustrating a graphical user interface (GUI) of the CRISIS according to various disclosed embodiments of the present disclosure.

As shown in FIG. 15, in an engine condition table management tab, the user is able to view the conditions of all the gas turbine engines. As the CRISIS constantly receives the sensor data from the sensors of the CBPM system, the cyberattack detection model detects the FDIAs in real-time, and displays compromised sensors. A predicted RUL and potential distribution are presented based on the outputs of the cyberattack detection model and the graphical Bayesian network model. Combining the information from the sensor data and detection results, the graphical Bayesian network model computes a health condition index for each component of the engine and identifies potential defective components. For example, LPT is detected as under the cyberattack.

In the embodiments of the present disclosure, the cyberattack detection model is used to characterize a performance state of the monitored CBPM system to identify and classify sources of the cyberattacks accurately and timely. In addition, the graphical Bayesian network model is used to represent the dynamic nature of a component or a subsystem of the CBPM system, encode the domain knowledge and the condition-symptom relationships of different plant components, and the sensors. The anomaly patterns (e.g., the cyberattacks) are efficiently revealed by the corresponding sensor readings and trends. Further, the hybrid implementation with the SITL mode and the HITL module for the cyberattack detection system accurately detects the cyberattack patterns, predicts the effects of the cyberattacks on the RUL estimation, and identifies the potential defective components, thereby improving cyber resilience of the CBPM system.

Figure 16:
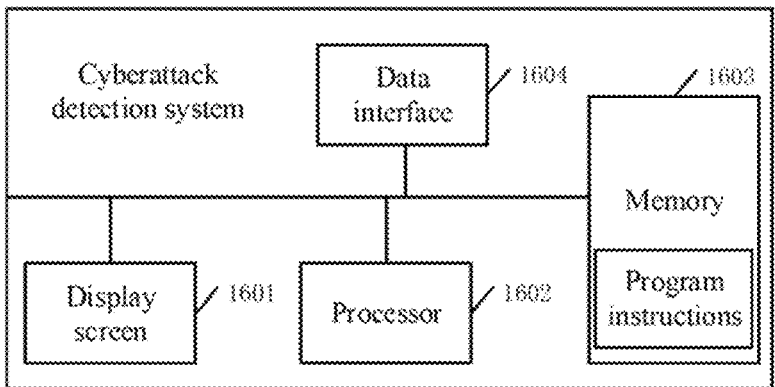
FIG. 16 depicts a structural block diagram illustrating a cyberattack detection system according to various disclosed embodiments of the present disclosure.

The present disclosure also provides a cyberattack detection system for detecting FDIAs. FIG. 16 depicts a structural block diagram illustrating a cyberattack detection system according to various disclosed embodiments of the present disclosure. As shown in FIG. 16, the cyberattack detection system includes a display screen 1601, a processor 1602, a memory 1603, and a data interface 1604.

The display screen 1601 may be a liquid crystal display (LCD) or an organic light-emitting diode (OLED) display. The display screen may also be a touch screen. The processor 1602 may be a central processing unit (CPU). The processor 1602 may also include a hardware chip. The hardware chip may be an application-specific integrated circuit (ASIC), a programmable logic device (PLD), or a combination thereof. For example, the PLD may be a complex programmable logic device (CPLD), a field-programmable gate array (FPGA), or a combination thereof. The memory 1603 may include a volatile memory. The memory 1603 may also include a non-volatile memory. The memory 1603 may also include a combination of the foregoing types of memories. The data interface 604 may include a keyboard, a mouse, a USB interface, and a communication interface. A user may use the keyboard, the mouse, and the USB interface to input the wafer image and the defect information.

In some embodiments, the memory 1603 stores program instructions. When the program instructions are executed, the processor 1602 calls the program instructions stored in the memory 1603 to perform: collecting sensor data from the sensors to extract features for a cyberattack detection model and gathering historical data of the system to build a cyberattack knowledge base about the system; combining the sensor data and the historical data to train the cyberattack detection model; using a graphical Bayesian network model to capture domain knowledge and condition-symptom relationships between the sensor-monitored components and the sensors; and based on the cyberattack detection model and the Bayesian network model, detecting false data injection attacks (FDIAs) on the CBPM system.

In some embodiments, the system maintained by the CBPM system includes a navy ship or a submarine, and the components of the system include at least a compressor and a turbine engine.

In some embodiments, the sensor data includes readings of one or more of an accelerometer, a strain gauge, and a thermometer, and the historical data is unstructured text data including one or more of a system operator log, hardware information, and software information.

In some embodiments, when gathering the historical data of the system to build the cyberattack knowledge base about the system, the processor 1602 is further configured to perform natural language processing to convert the unstructured text data into concepts and relationships to build the cyberattack knowledge base about the system.

In some embodiments, the cyberattack detection model includes a long short-term memory (LSTM) model or a gated recurrent unit (GRU) model.

In some embodiments, the processor 1602 is further configured to: separately train one cyberattack detection model for each sensor using the sensor data from the corresponding sensor, and determine which sensor is attacked based on the separately trained cyberattack detection model.

In some embodiments, the domain knowledge includes technical manuals and mathematical engine models that describe the components of the system, how the components are connected, which characteristics of the system are measured by the sensors; and how the system works. The domain knowledge provides a topological structure for the graphical Bayesian network model. The condition-symptom relationships determine the weights of links between nodes of the graphical Bayesian network model.

In some embodiments, the processor 1602 is further configured to integrate with the CBPM system to display each sensor being attacked by the FDIAs, detect global navigation satellite system (GNSS) and automatic identification system (AIS) spoofing, detect channel access attacks on the CBPM system, and predict the effect of the FDIAs on remaining useful life (RUL) of the system and make maintenance recommendation.

In the embodiments of the present disclosure, the cyberattack detection model is used to characterize a performance state of the monitored CBPM system to identify and classify sources of the cyberattacks accurately and timely. In addition, the graphical Bayesian network model is used to represent the dynamic nature of a component or a subsystem of the CBPM system, encode the domain knowledge and the condition-symptom relationships of different plant components and the sensors. The anomaly patterns (e.g., the cyberattacks) are efficiently revealed by the corresponding sensor readings and trends. Further, the hybrid implementation with the SITL mode and the HITL module for the cyberattack detection system accurately detects the cyberattack patterns, predicts the effects of the cyberattacks on the RUL estimation, and identifies the potential defective components, thereby improving the cyber resilience of the CBPM system.

The present disclosure also provides a computer-readable storage medium. The computer-readable storage medium stores a computer program. When being executed by a processor, the computer program implements the embodiments of the cyberattack detection method shown in FIG. 2. The description thereof is omitted.

The computer-readable storage medium may be an internal storage unit of the device described in any of the foregoing embodiments. For example, the computer-readable storage medium may be a hard disk or an internal memory of the device. The computer-readable storage medium may also be an external storage device of the device, such as a plug-in hard disk, a smart media card (SMC), a secure digital (SD) card, a flash card, etc. Further, the computer-readable storage medium may also include an internal storage unit and an external storage device. The computer-readable storage medium may also store the computer program, and other programs and data required by the device. The computer-readable storage medium may also temporarily store already outputted data or to-be-outputted data.

Those skilled in the art should understand that all or part of the processes in the foregoing method embodiments can be implemented by instructing relevant hardware through a computer program. The computer program may be stored in the computer-readable storage medium, and when being executed, the computer program implements the processes of the foregoing method embodiments. The storage medium may be a magnetic disk, an optical disk, a read-only memory (ROM), or a random-access memory (RAM).

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A method for detecting false data injection attacks (FDIAs) on a condition-based predictive maintenance (CBPM) system, comprising:

collecting sensor data from sensors that monitor components of a system maintained by the CBPM system to extract features for a cyberattack detection model and gathering historical data of the system to build a cyberattack knowledge base about the system;

combining the sensor data and the historical data to train the cyberattack detection model;

using a graphical Bayesian network model to capture domain knowledge and condition-symptom relationships between the components monitored by the sensors and the sensors;

based on the cyberattack detection model and the Bayesian network model, detecting the FDIAs on the CBPM system, wherein the FDIAs include injection of the sensor data for both normal operation and abnormal operation; and computing, by the graphical Bayesian network model, a health condition index for each of the components and identifying potential defective components, wherein:
   the CBPM system includes a Kafka module, a soft-
      ware-in-the-loop (SITL) module and a hardware-in-
      the-loop (HITL) module to support multiple tasks;
   the cyberattack detection model and the graphical
      Bayesian network model are between the SITL mod-
      ule and the HITL module;
   the Kafka module streams data of the detected FDIAs
      to the SITL module; and
   the cyberattack detection model, the graphical Bayes-
      ian network model, and the Kafka module are inte-
      grated by a Raspberry Pi for real-time data acquisi-
      tion and cyberattack detection.
2. The method according to claim 1, wherein:
   the system includes a navy ship or a submarine; and
   the components of the system include at least a compres-
      sor and a turbine engine.
3. The method according to claim 2, wherein:
   the sensor data includes readings of one or more of an
      accelerometer, a strain gauge, and a thermometer; and
   the historical data is unstructured text data including one
      or more of a system operator log, hardware informa-
      tion, and software information.
4. The method according to claim 3, wherein gathering the
historical data of the system to build the cyberattack knowl-
edge base about the system includes:
   performing natural language processing to convert the
      unstructured text data into concepts and relationships to
      build the cyberattack knowledge base about the system.
5. The method according to claim 1, wherein:
   the cyberattack detection model includes a long short-
      term memory (LSTM) model or a gated recurrent unit
      (GRU) model.
6. The method according to claim 1, further comprising:
   separately training one cyberattack detection model for
      each sensor using the sensor data from the correspond-
      ing sensor; and
   determining which sensor is attacked based on the sepa-
      rately trained cyberattack detection model.
7. The method according to claim 1, wherein:
   the domain knowledge includes technical manuals and
      mathematical engine models that describe the compo-
      nents of the system, how the components are con-
      nected, which characteristics of the system are mea-
      sured by the sensors; and how the system works;
   the domain knowledge provides a topological structure
      for the graphical Bayesian network model; and
   the condition-symptom relationships determine weights
      of links between nodes of the graphical Bayesian
      network model.
8. The method according to claim 1, further comprising:
   integrating with the CBPM system to display each sensor
      being attacked by the FDIAs, detect global navigation
      satellite system (GNSS) and automatic identification
      system (AIS) spoofing, detect channel access attacks on
      the CBPM system, and predict effect of the FDIAs on
      remaining useful life (RUL) of the system and make
      maintenance recommendation.
9. A condition-based predictive maintenance (CBPM)
system, comprising:
   sensors that monitor components of a system maintained
      by the CBPM system;
   a memory storing computer programs; and
   a processor configured to execute the computer programs
      to:
      collect sensor data from the sensors to extract features
         for a cyberattack detection model and gather historical data of the system to build a cyberattack knowl-
            edge base about the system;
      combine the sensor data and the historical data to train
         the cyberattack detection model;
      use a graphical Bayesian network model to capture
         domain knowledge and condition-symptom relation-
         ships between the components monitored by the
         sensors and the sensors;
      based on the cyberattack detection model and the
         Bayesian network model, detect false data injection
         attacks (FDIAs) on the CBPM system, wherein the
         FDIAs include injection of the sensor data for both
         normal operation and abnormal operation; and
      use the graphical Bayesian network model to compute a
         health condition index for each of the components and
         identify potential defective components,
   wherein:
      the CBPM system further includes a Kafka module, a
         software-in-the-loop (SITL) module and a hardware-
         in-the-loop (HITL) module to support multiple tasks;
      the cyberattack detection model and the graphical
         Bayesian network model are between the SITL mod-
         ule and the HITL module;
      the Kafka module streams data of the detected FDIAs
         to the SITL module; and
      the cyberattack detection model, the graphical Bayes-
         ian network model, and the Kafka module are inte-
         grated by a Raspberry Pi for real-time data acquisi-
         tion and cyberattack detection.
10. The CBPM system according to claim 9, wherein:
   the system includes a navy ship or a submarine; and
   the components of the system include at least a compres-
      sor and a turbine engine.
11. The CBPM system according to claim 10, wherein:
   the sensor data includes readings of one or more of
      accelerometers, a strain gauge, and a thermometer; and
   the historical data is unstructured text data including one
      or more of a system operator log, hardware informa-
      tion, and software information.
12. The CBPM system according to claim 11, wherein
when gathering the historical data of the system to build the
cyberattack knowledge base about the system, the processor
is further configured to:
   perform natural language processing to convert the
      unstructured text data into concepts and relationships to
      build the cyberattack knowledge base about the system.
13. The CBPM system according to claim 9, wherein:
   the cyberattack detection model includes a long short-
      term memory (LSTM) model or a gated recurrent unit
      (GRU) model.
14. The CBPM system according to claim 9, wherein the
processor is further configured to:
   separately train one cyberattack detection model for each
      sensor using the sensor data from the corresponding
      sensor; and
   determine which sensor is attacked based on the sepa-
      rately trained cyberattack detection model.
15. The CBPM system according to claim 9, wherein:
   the domain knowledge includes technical manuals and
      mathematical engine models that describe the compo-
      nents of the system, how the components are con-
      nected, which characteristics of the system are mea-
      sured by the sensors; and how the system works;
   the domain knowledge provides a topological structure
      for the graphical Bayesian network model; and

US 12,619,726 B2

19 the condition-symptom relationships determine weights of links between nodes of the graphical Bayesian network model.

16. The CBPM system according to claim 9, wherein the processor is further configured to:

integrate with the CBPM system to display each sensor being attacked by the FDIAs, detect global navigation satellite system (GNSS) and automatic identification system (AIS) spoofing, detect channel access attacks on the CBPM system, and predict effect of the FDIAs on remaining useful life (RUL) of the system and make maintenance recommendation.

17. A non-transitory computer-readable storage medium storing a computer program for detecting false data injection attacks (FDIAs) on a condition-based predictive maintenance (CBPM) system, when being executed by a processor, the computer program causing the processor to perform:

collecting sensor data from sensors that monitor components of a system maintained by the CBPM system to extract features for a cyberattack detection model and gathering historical data of the system to build a cyberattack knowledge base about the system;

combining the sensor data and the historical data to train the cyberattack detection model;

using a graphical Bayesian network model to capture domain knowledge and condition-symptom relationships between the components monitored by the sensors and the sensors;

based on the cyberattack detection model and the Bayesian network model, detecting the FDIAs on the CBPM system, wherein the FDIAs include injection of the sensor data for both normal operation and abnormal operation; and using the graphical Bayesian network model to compute a health condition index for each of the components and identify potential defective components,

20 wherein:

the CBPM system includes a Kafka module, a software-in-the-loop (SITL) module and a hardware-in-the-loop (HITL) module to support multiple tasks;

the cyberattack detection model and the graphical Bayesian network model are between the SITL module and the HITL module;

the Kafka module streams data of the detected FDIAs to the SITL module; and the cyberattack detection model, the graphical Bayesian network model, and the Kafka module are integrated by a Raspberry Pi for real-time data acquisition and cyberattack detection.

18. The non-transitory computer-readable storage medium according to claim 17, wherein:

the system includes a navy ship or a submarine; and the components of the system include at least a compressor and a turbine engine.

19. The non-transitory computer-readable storage medium according to claim 18, wherein:

the sensor data includes readings of one or more of accelerometers, a strain gauge, and a thermometer; and the historical data is unstructured text data including one or more of a system operator log, hardware information, and software information.

20. The non-transitory computer-readable storage medium according to claim 19, wherein when gathering the historical data of the system to build the cyberattack knowledge base about the system, the processor is further configured to perform:

performing natural language processing to convert the unstructured text data into concepts and relationships to build the cyberattack knowledge base about the system.

* * * * *